(12) United States Patent
Desrochers et al.

(10) Patent No.: US 6,534,941 B2
(45) Date of Patent: Mar. 18, 2003

(54) CASING FOR CLOSURE OPERATING DEVICE

(75) Inventors: Eddy Desrochers, St-Hubert (CA); Daniel Lelièvre, St-Eustache (CA)

(73) Assignee: Manaras Door & Gate Operator Company, Pointe-Claire (CA)

( * ) Notice: Subject to any disclaimer, the term of this patent is extended or adjusted under 35 U.S.C. 154(b) by 139 days.

(21) Appl. No.: 09/734,022

(22) Filed: Dec. 12, 2000

(65) Prior Publication Data

US 2001/0035726 A1 Nov. 1, 2001

(30) Foreign Application Priority Data

Apr. 26, 2000 (CA) .............................. 2306611

(51) Int. Cl.⁷ ............................ G05B 5/00; G05D 3/00; H02H 7/08; H02P 1/04; H02P 7/00
(52) U.S. Cl. ........................ 318/466; 318/266; 160/19
(58) Field of Search ................................. 318/460, 466, 318/264–266; 160/201, 209, 19, 188–191

(56) References Cited

U.S. PATENT DOCUMENTS

| | | | | |
|---|---|---|---|---|
| 4,475,069 A | * | 10/1984 | Tadokoro et al. | ........... 318/265 |
| 4,979,603 A | * | 12/1990 | Wheatland | ........... 192/150 |
| 6,020,703 A | * | 2/2000 | Telmet | ........... 318/480 |
| 6,181,095 B1 | * | 1/2001 | Telmet | ........... 318/480 |
| 6,381,903 B1 | * | 5/2002 | Desrochers et al. | ........... 49/139 |
| 6,437,527 B1 | * | 8/2002 | Rhodes et al. | ........... 318/280 |

* cited by examiner

Primary Examiner—Jeffrey Donels
(74) Attorney, Agent, or Firm—Robert Mitchell; Ogilvy Renault

(57) ABSTRACT

A closure operating device comprises a control unit for controlling a power actuator operatively connected to a closure to selectively open and close the same. The control unit and the power actuator are mounted to a casing adapted to be mounted on a wall. The casing defines an interior space which is normally closed by a lid which defines itself a compartment for receiving parts of the control unit. A limit switch mechanism is mounted in the compartment for automatically interrupting power transmission to the power actuator when the closure reaches a fully open position or a fully closed position thereof. The limit switch mechanism includes a pair of switch actuators threadably engaged on a shaft. The switch actuators are normally locked against rotation by an anti-rotation member. The anti-rotation member is adapted to be independently disengaged from the switch actuators to prevent accidental displacement of one of the switch actuators while the other one is being manually adjusted.

20 Claims, 3 Drawing Sheets

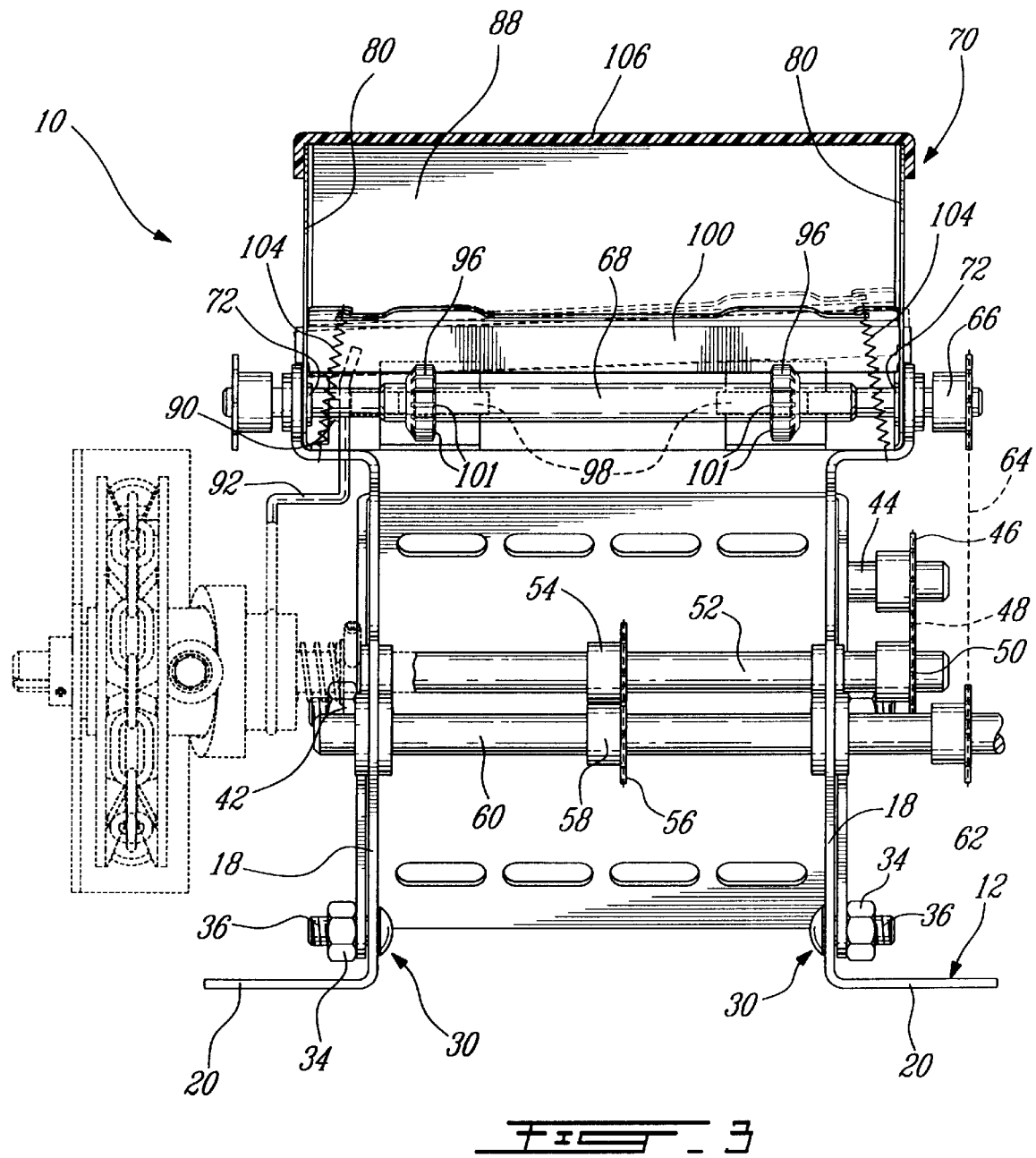

CASING FOR CLOSURE OPERATING DEVICE

BACKGROUND OF THE INVENTION

1. Field of the Invention

The present invention relates to a closure operating device and, more particularly, to a casing structure for such a closure operating device.

2. Description of the Prior Art

It is well known to provide a closure operating device, mounted on a wall, to mechanically displace an overhead door between open and closed positions thereof. Such closure operating devices typically include a control unit for controlling the operation of a power actuator operatively connected to an overhead door. The power actuator is mounted to a casing which defines a compartment for receiving electric and electronic components forming part of the control system. The power actuator typically includes an electric motor having an output shaft which is connected to one or more shafts journaled to the casing. The shafts are typically connected to each other via a series of endless chains extending over sprocket wheels keyed onto the shafts.

Access to the sprocket wheels is normally prevented by the casing. When it is desired to have access to the sprocket wheels, the operator has to remove the casing from the wall on which it is mounted so as to expose a rear open side thereof.

It has been found that there is a need for a new casing which could selectively allow and prevent access to parts housed therein while remaining mounted on a mounting surface, such as a wall.

The control unit of closure operating devices of the type described hereinbefore generally includes a limit switch mechanism for automatically interrupting power transmission to the power actuator when the closure has been displaced to its fully open and closed positions. Such a limit switch mechanism generally comprises a pair of switch actuators threadably engaged on a threaded shaft coupled to the output shaft of the device. These switch actuators are normally engaged by an anti-rotation member to cause axial displacement of the switch actuators along the threaded shaft when the latter is rotated. Adjustment of the switch actuators is effected by first simultaneously disengaging the anti-rotation member from the switch actuators and then independently rotating the actuators to cause axial movement thereof on the threaded shaft. By simultaneously unlocking the switch actuators, there is a risk that one of the switch actuators is accidentally displaced out of its functional position while the other one is being adjusted.

SUMMARY OF THE INVENTION

It is therefore an aim of the present invention to provide a closure operating device having a new casing which is adapted to provide access to parts housed therein while the casing is mounted to a mounting surface.

It is also an aim of the present invention to provide a new limit switch mechanism adapted to reduce the risk of altering the adjustment of a part thereof while adjusting the position of another part thereof.

Therefore, in accordance with the present invention, there is provided a closure operating device comprising a casing adapted to be mounted to a mounting surface and defining an interior space accessible through an access opening, a lid mounted to said casing for pivotal movement between an open position thereof to provide access to said interior space through said access opening and a closed position thereof to prevent access to said interior space, said lid defining a compartment, an output shaft journaled to said casing and extending through said interior space, a power actuator operatively connected to said output shaft for opening and closing a closure, and a control system for controlling operation of said power actuator, said control system being at least partly housed within said compartment of said lid.

In accordance with a further general aspect of the present invention, there is provided a limit switch mechanism for controlling the operation of a motor over a selected range of movement, comprising a casing, a motor-driven threaded shaft journaled to said casing, first and second switch actuators threadably engaged on said threaded shaft and adjustably positionable thereon, first and second limit switches mounted at spaced-apart locations on said casing adjacent to said threaded shaft so as to be respectively actuated by said first and second switch actuators upon reaching respective predetermined positions on said threaded shaft, at least one anti-rotation member connected to said casing for movement between a first position for engaging said first and second switch actuators to prevent rotation of said first and second switch actuators on said threaded shaft and cause simultaneous axial displacement of said first and second switch actuators along said threaded shaft in response of a rotational movement thereof, and a selected one of a second position and a third position for allowing a respective one of said first and second switch actuators to be disengaged from said anti-rotation member while the other one of said first and second switch actuators remains locked against rotation by said anti-rotation member such that a position of said selected one of said first and second switch actuators may be adjusted.

BRIEF DESCRIPTION OF THE DRAWINGS

Having thus generally described the nature of the invention, reference will now be made to the accompanying drawings, showing by way of illustration a preferred embodiment thereof, and in which:

FIG. 3 is a top plan view, partly in cross-section, of the wall mounted closure operating device of FIG. 1 illustrating how a limit switch mechanism can be adjusted.

DESCRIPTION OF THE PREFERRED EMBODIMENTS

Figure 1:
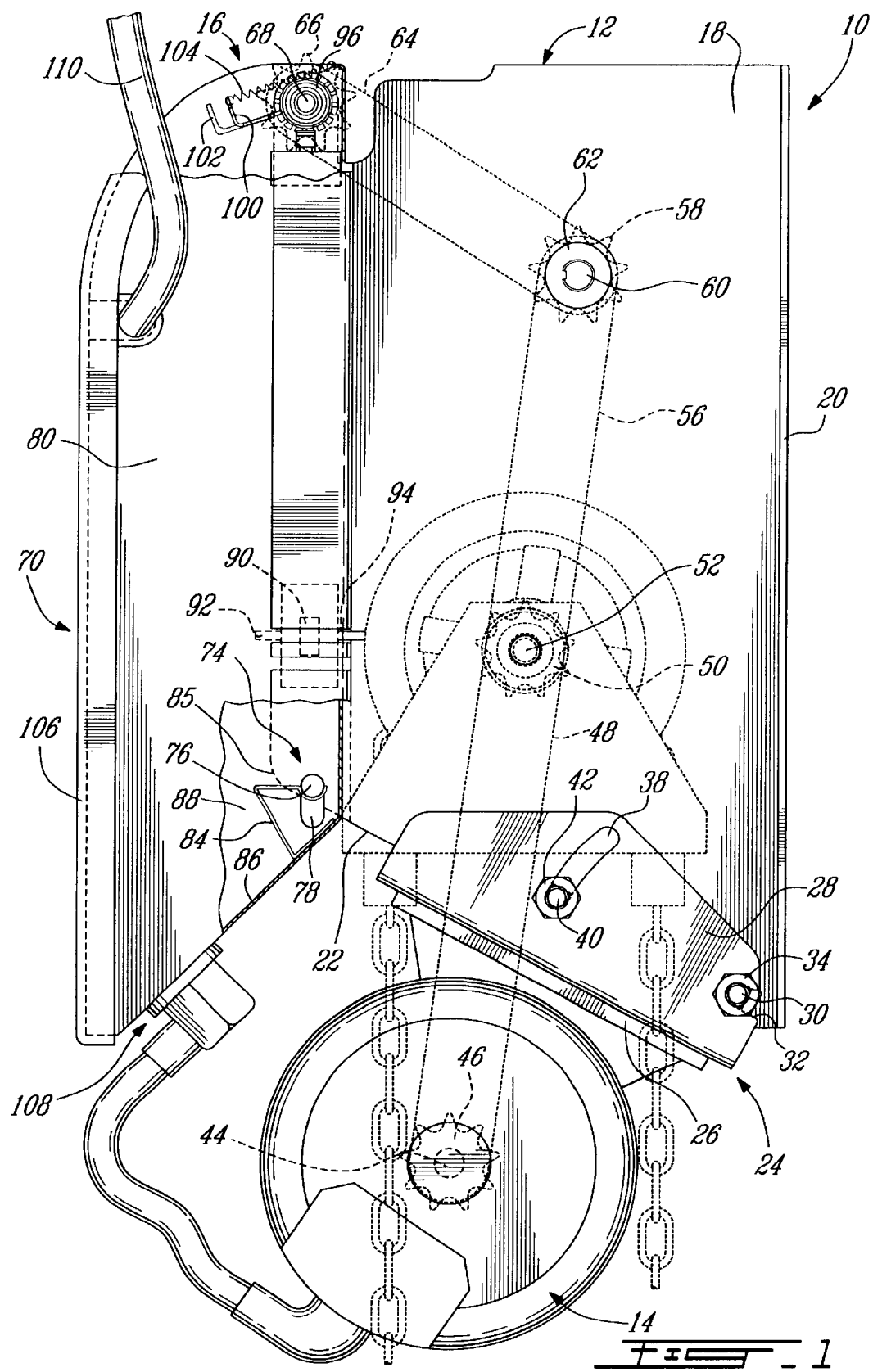
FIG. 1 is a side elevational view of a wall mounted closure operating device having a casing defining an interior space closed by a lid in accordance with a first embodiment of the present invention.
Figure 2:
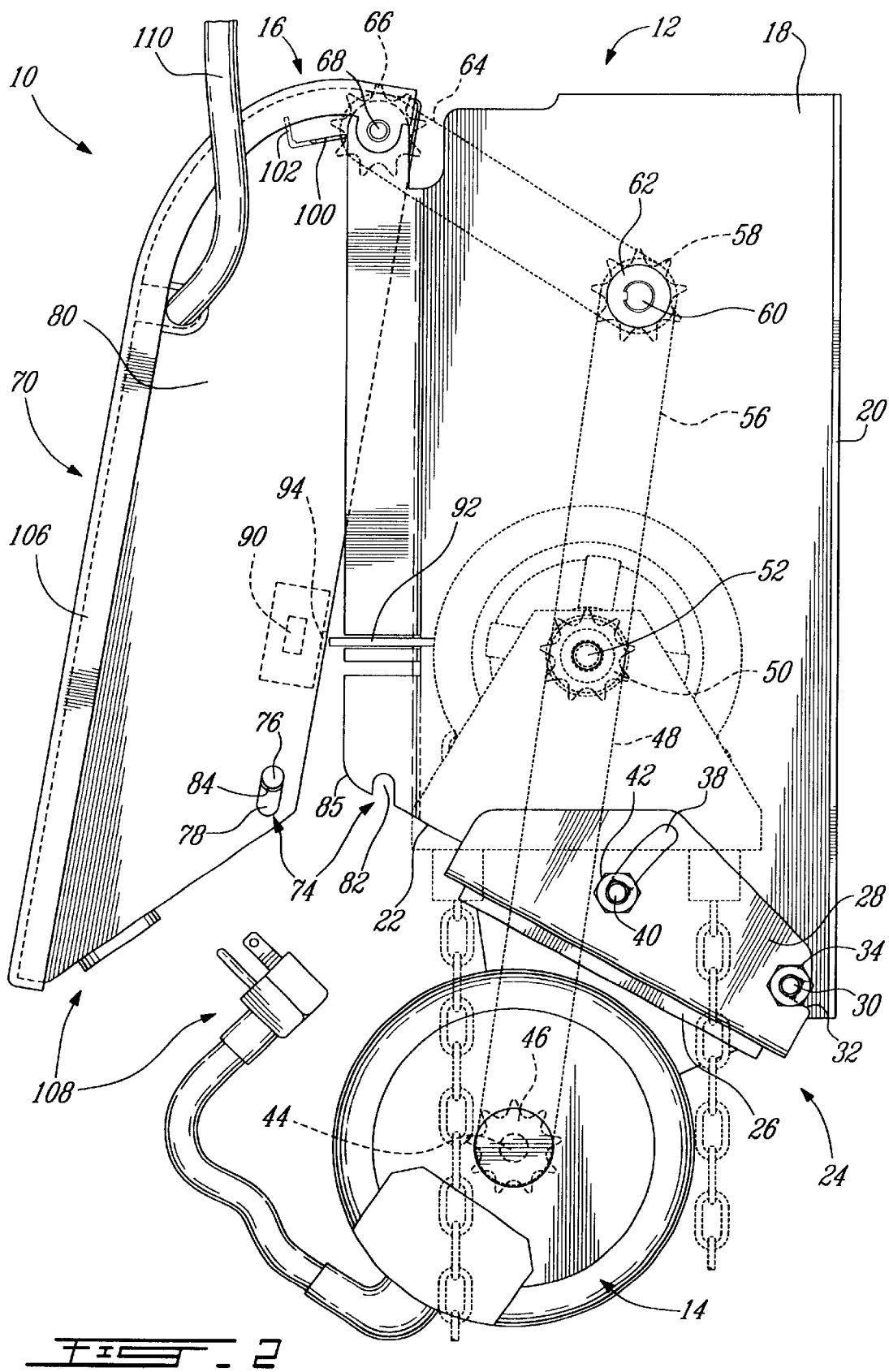
FIG. 2 is a side elevational view of the wall mounted closure operating device illustrating the lid in a partly open position thereof to provide access to the interior space of the casing.

FIGS. 1 to 3 illustrate a closure operating device 10 adapted to be mounted on a wall to mechanically displace a closure (not shown), such as a garage door, between open and closed positions thereof.

The closure operating device 10 generally includes a casing 12 supporting a power actuator, such as an electric motor 14, and housing part of a control system 16 adapted to control the operation of the electric motor 14.

The casing 12 includes a pair of identical side panels 18 merging at respective rear end portions thereof into outwardly extending flanges 20. The flanges 20 define holes (not shown) therein for receiving appropriate fasteners (not shown) to mount the casing 12 on a flat surface, such as a building wall adjacent an opening defined therein.

As seen in FIGS. 1 and 2, the side panels 18 have respective inclined lower edges 22 extending upwardly towards a forward direction. The inclined lower edges 22 are partly covered by a motor mounting bracket 24 which is pivotally mounted to the side panels 18 for pivotal movement between fixed positions. The motor mounting bracket 24 includes a mounting plate 26 and a pair of lateral plates 28 extending rearwardly from opposed sides of the mounting plate 26. The lateral plates 28 are spaced-apart so as to receive therebetween the lower end portion of the side panels 18. The lateral plates 28 are pivotally mounted on pivot pins 30 extending laterally outwardly of the side panels 18. Each pivot pin 30 is received in an indentation 32 defined in each of the lateral plates 28. A nut 34 is threadably engaged on a threaded end portion 36 of each pivot pin 30 to prevent dislodgment thereof.

Registering arcuate slots 38 are defined in the lateral plates 28 to receive therein corresponding guide pins 40 removably inserted through corresponding holes (not shown) defined in the lower end portion of the side panels 18 so as to extend laterally outwardly with respect thereto. Each guide pin 40 has a threaded end portion on which a nut 42 is threadably engaged for releasably securing the motor mounting bracket 24 in a predetermined angular position relative to the side panels 18.

Each guide pin 40 is preferably provided in the form of a bolt having a head (not shown) and successive unthreaded and threaded shank portions.

The motor mounting bracket 24 can be readily mounted to the side panels 18 by first engaging the indentations 32 on the pivot pins 30 and then inserting the guide pins 40 through the side panels 18 and into the registering slots 38. Thereafter, the position of the motor mounting bracket 24 relative to the side panels 18 can be adjusted and the nuts 34 and 42 tightened against the outer surface of the lateral plates 28 to secure the motor mounting bracket 24 in position.

The electric motor 14 is secured to the mounting plate 26 by means of appropriate fasteners. The motor 14 has an output shaft 44 on which a sprocket 46 is keyed. The sprocket 46 is engaged by an endless chain 48 extending also over a second sprocket 50 fixedly mounted on an intermediate shaft 52 journaled to the side panels 18 and extending transversally with respect thereto. By pivoting the mounting bracket 24 with respect to the side panels 18, it becomes possible to easily vary the position of the output shaft 44 relative to the intermediate shaft 52 so that the distance therebetween corresponds to the length of the chain 48 used to transmit a torque from the output shaft 44 to the intermediate shaft 52. The possibility of varying the position of the mounting bracket 24 allows chains of various lengths to be used to couple the intermediate shaft 52 and the output shaft 44 of the motor 14.

A sprocket wheel 54 is keyed on the intermediate shaft 52 between the side panels 18. An endless chain 56 extends over the sprocket wheel 54 and another sprocket wheel 58 keyed on an output shaft 60 journaled to the side panels 18. The chain 56 transmits a torque from the intermediate shaft 52 to the output shaft 60 which is operatively connected to the closure to open and close the same.

A sprocket wheel 62 is keyed on the output shaft 60 for rotation therewith. The sprocket wheel 62 is engaged by an endless chain 64 extending also over another sprocket wheel 66 secured to a shaft 68 journaled to front upper portions of the side panels 18.

The front portions of the side panels 18 are curved laterally outwardly to define an enlarged interior space for receiving a lid 70 mounted for pivotal movement about the shaft 68. Bushings 72 are provided to allow the shaft 68 to freely rotate relative to the lid 70.

As seen in FIGS. 1 and 2, the lid 70 is pivotable about the shaft 68 between a closed position (FIG. 1) to prevent access to the interior space of the casing 12 where the sprocket wheels 54 and 58 and the chain 56 are, and an open position to provide access thereto.

A latch mechanism 74 is provided for releasably securing the lid 70 in its closed position. The latch mechanism 74 includes a lock pin 76 extending laterally outwardly of a pair of registering slots 78 defined in opposed sides 80 of the lid 70. The lock pin 76 is adapted to engage a catch provided in the form of a pair of indentations 82 (see FIG. 2) defined in the lower edges 22 of the side panels 18. A spring blade 84 is secured to a front surface 86 of a compartment 88 defined within the lid 70 to urge the lock pin 76 upwardly in engagement within the indentations 82 when the lid 70 is closed.

The lock pin 76 can be readily disengaged from the indentations 82 to allow the lid 70 to be pivoted towards its open position by pushing downwardly on the ends of the lock pin 76 so as to overcome the biasing force of the spring blade 84.

As seen in FIG. 2, chamfers are formed at 85 to guide the lock pin 76 into the indentations 82 when the lid 70 is pivoted back to its closed position.

The compartment 88 is essentially used to house electrical and electronic components (not all shown) forming part of the control system 16.

The control system 16 includes a switch 90 for automatically cutting all power to the electric motor 14 when the lid 70 is pivoted away from its closed position. The switch 90 is mounted within the compartment 88 so as to be engaged by a stationary switch actuator 92 extending within the compartment 88 through a hole 94 defined in the bottom thereof. As seen in FIG. 2, the pivot of the lid 70 towards its open position will cause the switch 90 to be disengaged from the switch actuator 92, thereby automatically interrupting power transmission to the electric motor 14 when the lid 70 is open.

As seen in FIG. 3, the switch actuator 92 is provided in the form of an elongated rod mounted to the intermediate shaft 52. However, it is understood that the switch actuator 92 could take other forms as well and could be mounted to the casing 12 instead of on the intermediate shaft 52.

The control system 16 also includes a pair of switch actuators 96 which are threadably engaged on a threaded portion of the shaft 68 at axially spaced-apart locations thereon for triggering respective limit switches 98 in order to shut down the electric motor 14 when the closure has been displaced to a fully open or closed position thereof. An anti-rotation member in the form of an elongated strip 100 is provided to normally engage any of a series of peripheral slots 101 defined in parallel on both switch actuators 96 to prevent rotational movement thereof on the shaft 68, thereby enabling the same to be axially displaced therealong in response of the rotation of the shaft 68 when the latter is driven by the output shaft 60. The position of the switch actuators 96 can be independently manually adjusted on the shaft 68 to ensure that the triggering of the limit switches 98 by the switch actuators 96 will be coordinated with the opening and closing of the closure.

The strip 100 is engaged at opposed ends thereof in elongated slots 102 defined in the sides of the lid 70. A pair of springs 104 are connected at respective first ends thereof to opposed end portions of the strip 100 and at respective second ends to the side panels 18 of the casing 12. The springs 104 are adapted to normally bias the strip 100 in engagement with both switch actuators 96.

As seen in FIG. 3, when it is desired to adjust the position of one of the switch actuator 96 on the shaft 68, the operator has simply to pull on one side of the strip 100 to displace the same in a slanted fashion relative to the shaft 68 to thereby disengage only one of the switch actuator 96 from one of the slots 101 of the strip 100. Then, while holding the strip 100 in a slanted position, as shown in FIG. 3, the operator has only to rotate the "unlocked" switch actuator 96 to cause the same to move axially on the shaft 68 to a predetermined position. During all this operation, the other switch actuator 96 remains locked against rotation, thereby eliminating the potential risks that the same be inadvertently displaced.

A cover 106 is removably mounted onto the lid 70 to selectively provide or prevent access to the compartment 88. A linkage (not shown) could be provided between the casing 12 and the lid 70 to limit the pivotal movement of the lid 70 relative to the casing 12.

Quick electric connections, such as at 108 (see FIGS. 1 and 2), can be provided to allow the electric motor 14 to be readily disconnected from the electric circuit of the control system 16 when it is desired to open the lid 70. The electricity can be supplied to the electric circuit of the control system 16 by the main electric circuit of the building via a cable 110 extending into the compartment 88 near the pivot axis of the lid 70. This advantageously eliminates the need of disconnecting the electric circuit of the control system 16 from the source of power in order to open the lid 70.

What is claimed is:

1. A closure operating device comprising a casing adapted to be mounted to a mounting surface and defining an interior space accessible through an access opening, a lid mounted to said casing for pivotal movement between an open position thereof to provide access to said interior space through said access opening and a closed position thereof to prevent access to said interior space, said lid defining a compartment, an output shaft journaled to said casing and extending through said interior space, a power actuator operatively connected to said output shaft for opening and closing a closure, and a control system for controlling operation of said power actuator, said control system being at least partly housed within said compartment of said lid.

2. A closure operating device as defined in claim 1, wherein said control system includes a switch for automatically cutting all power transmission to said power actuator when said lid is pivoted away from said closed position.

3. A closure operating device as defined in claim 2, wherein said switch is mounted within said compartment for joint movement with said lid, said switch being engageable with a stationary switch actuator extending within said compartment.

4. A closure operating device as defined in claim 3, wherein said switch is engaged with said stationary switch actuator when said lid is in said closed position thereof and moved out of engagement with said stationary switch actuator when said lid is displaced to said open position thereof in order to automatically de-energize said power actuator when said lid is opened to provide access to said interior space.

5. A closure operating device as defined in claim 1, wherein said lid is pivotally mounted on a shaft journaled to said casing.

6. A closure operating device as defined in claim 5, wherein said shaft is driven by said output shaft via a drive means.

7. A closure operating device as defined in claim 6, wherein said control system further includes at least one switch actuator threadably engaged on a threaded portion of said shaft and adjustably positionable thereon, at least one limit switch mounted within said compartment adjacent to said shaft so as to be actuated by said switch actuator when the same reaches a predetermined position on said shaft, an anti-rotation member mounted within said compartment for normally engaging said switch actuator to prevent rotation thereof on said shaft and cause axial displacement of said switch actuator along said shaft in response of a rotational movement of said shaft.

8. A closure operating device as defined in claim 1, further including a latch for releasably securing said lid to said closed position thereof, said latch including a lock pin which is constrained to move in a slotted guide defined in said lid, a catch defined in said casing, and biasing means for urging said lock pin in engagement with said catch when said lid assumes said closed position.

9. A closure operating device as defined in claim 8, wherein said slotted guide includes a pair of registering slots defined in opposed sides of said lid, said lock pin extending transversally outwardly of said registering slots for engaging said catch.

10. A closure operating device as defined in claim 9, wherein said catch includes a pair of registering indentations defined in opposed side walls of said casing, said lid being sized to fit between said side walls.

11. A closure operating device as defined in claim 10, wherein said side walls are provided with respective rounded edges for leading said lock pin to said registering indentations when said lid is pivoted to said closed position.

12. A closure operating device as defined in claim 8, wherein said biasing means include a spring blade secured to an inner surface of said compartment.

13. A closure operating device as defined in claim 1, wherein said lid includes a removable cover to selectively close and open said compartment.

14. A closure operating device as defined in claim 1, wherein said casing further includes a pivotable actuator mounting plate for supporting said power actuator, said mounting plate being pivotable between fixed positions for adjusting the distance between a driving shaft of said power actuator and said actuator.

15. A limit switch mechanism for controlling the operation of a motor over a selected range of movement, comprising a casing, a motor-driven threaded shaft journaled to said casing, first and second switch actuators threadably engaged on said threaded shaft and adjustably positionable thereon, first and second limit switches mounted at spaced-apart locations on said casing adjacent to said threaded shaft so as to be respectively actuated by said first and second switch actuators upon reaching respective predetermined positions on said threaded shaft, at least one anti-rotation member connected to said casing for movement between a first position for engaging said first and second switch actuators to prevent rotation of said first and second switch actuators on said threaded shaft and cause simultaneous axial displacement of said first and second switch actuators along said threaded shaft in response of a rotational movement thereof, and a selected one of a second position and a third position for allowing a respective one of said first and second switch actuators to be disengaged from said anti-rotation member while the other one of said first and second switch actuators remains locked against rotation by said anti-rotation member such that a position of said selected one of said first and second switch actuators may be adjusted.

16. A limit switch mechanism as defined in claim 15, wherein said anti-rotation member is normally engaged to both said first and second switch actuators and is independently biased in engagement with each of said first and second switch actuators.

17. A limit switch mechanism as defined in claim 16, wherein first and second biasing members are provided for respectively urging said anti-rotation member in engagement with said first and second switch actuators and wherein said anti-rotation member is adapted to be displaced slantwise for disengagement from a selected one of said first and second switch actuators.

18. A limit switch mechanism as defined in claim 17, wherein said anti-rotation member includes an elongated strip having an elongated edge engageable within peripheral slots defined on said first and second switch actuators, and wherein said elongated strip is constrained to move in a slotted guide.

19. A limit switch mechanism as defined in claim 18, wherein said first and second biasing members respectively include first and second springs, said first spring having a first end connected to said casing and a second end connected to a first end portion of said elongated strip, said second spring having a first end connected to said casing and a second end connected to a second end portion of said elongated strip.

20. A limit switch as defined in claim 18, wherein said slotted guide includes first and second registering slots, said first and second end portions of said elongated strip being respectively received in said first and second registering slots.

* * * * *